United States Patent
Emig et al.

(10) Patent No.: US 10,408,351 B2
(45) Date of Patent: Sep. 10, 2019

(54) SEALING ARRANGEMENT AND USE THEREOF

(71) Applicant: Carl Freudenberg KG, Weinheim (DE)

(72) Inventors: Juergen Emig, Grasellenbach (DE); Simon Watling, Blyth (GB); Matt Billany, Washington (GB); Paul Waddell, North Shields (GB); Ross Dixon, Newcastle (GB)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/813,170

(22) Filed: Nov. 15, 2017

(65) Prior Publication Data

US 2018/0135758 A1     May 17, 2018

(30) Foreign Application Priority Data

Nov. 16, 2016   (DE) .................. 10 2016 013 638

(51) Int. Cl.
*F16J 15/3236*    (2016.01)
*F16J 15/56*      (2006.01)
(Continued)

(52) U.S. Cl.
CPC ......... *F16J 15/3236* (2013.01); *F16J 15/164* (2013.01); *F16J 15/56* (2013.01); *F16F 9/363* (2013.01)

(58) Field of Classification Search
CPC ........ F16J 15/3236; F16J 15/164; F16J 15/56; F16J 1/008; F16J 15/025; F16J 15/3204; F16J 15/3232; F16F 9/363
(Continued)

(56) References Cited

U.S. PATENT DOCUMENTS 3,218,087 A   11/1965 Hallesy
3,895,815 A   7/1975 Panigati
(Continued)

FOREIGN PATENT DOCUMENTS

DE   3703360 A1   8/1988
DE   3828692 A1   3/1990
(Continued)

*Primary Examiner* — Nathan Cumar
(74) *Attorney, Agent, or Firm* — Leydig, Voit & Mayer, Ltd.

(57) ABSTRACT

In an embodiment, the present invention provides a sealing arrangement for sealing two chambers that are adjacent to one another in an axial direction and are to be sealed with respect to one another, including: a first machine element; a second machine element, the second machine element surrounding the first machine element with a radial spacing therebetween, the sealing ring being arranged in the gap formed by the radial spacing; and a sealing ring, the sealing ring including at least one dynamically loaded first sealing lip, which sealingly surrounds a surface to be sealed of the first machine element, the sealing ring being arranged in an installation chamber of the second machine element and the sealing ring comprising a first and a second end face, the first end face axially facing the first chamber to be sealed and the second end face axially facing the second chamber to be sealed.

12 Claims, 3 Drawing Sheets

(51) Int. Cl.
*F16J 15/16* (2006.01)
*F16F 9/36* (2006.01)

(58) Field of Classification Search
USPC .......................................................... 277/345
See application file for complete search history.

(56) References Cited

U.S. PATENT DOCUMENTS

| | | |
|---|---|---|
| 5,104,131 A | 4/1992 | Edlund et al. |
| 2001/0023638 A1* | 9/2001 | Yamaguchi ............. F16F 9/363 92/165 R |
| 2003/0024780 A1* | 2/2003 | Yasuda ................... F16F 9/062 188/322.17 |
| 2003/0070893 A1* | 4/2003 | Adrian .................... F16F 9/363 188/322.16 |
| 2004/0046330 A1 | 3/2004 | Wobben |
| 2005/0067242 A1* | 3/2005 | Vanmechelen ....... F16F 9/3242 188/322.17 |
| 2013/0001887 A1* | 1/2013 | Begg ................... F16J 15/3284 277/549 |
| 2015/0003766 A1* | 1/2015 | Duch ...................... F16C 19/04 384/480 |

FOREIGN PATENT DOCUMENTS

| | | |
|---|---|---|
| DE | 4104070 A1 | 8/1992 |
| DE | 19728605 A1 | 2/1999 |
| DE | 10102161 A1 | 8/2002 |
| FR | 1438393 A | 5/1966 |

* cited by examiner

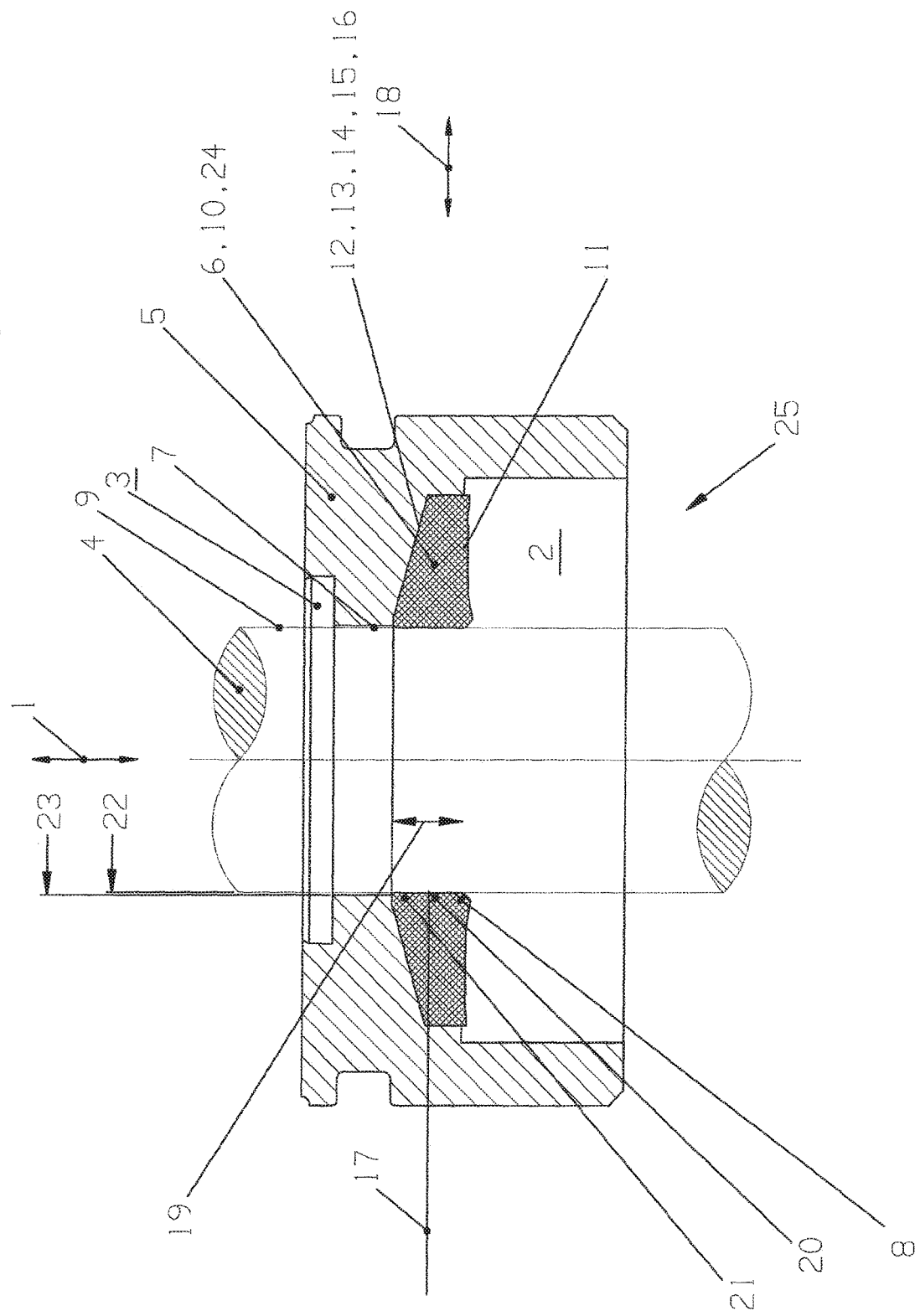

SEALING ARRANGEMENT AND USE THEREOF

CROSS-REFERENCE TO PRIOR APPLICATION

Priority is claimed to German Patent Application No. DE 10 2016 013 638.3, filed on Nov. 16, 2016, the entire disclosure of which is hereby incorporated by reference herein.

FIELD

The invention relates to a sealing arrangement for sealing two chambers that are adjacent to one another in the axial direction and are to be sealed with respect to one another, comprising a first machine element, a second machine element and a sealing ring, the first machine element being surrounded by the second machine element with a radial spacing therebetween and the sealing ring being arranged in the gap formed by the radial spacing, the sealing ring comprising at least one dynamically loaded first sealing lip, which sealingly surrounds a surface to be sealed of the first machine element, the sealing ring being arranged in an installation chamber of the second machine element and the sealing ring comprising a first and a second end face, the first end face axially facing the first chamber to be sealed and the second end face axially facing the second chamber to be sealed, it being possible to subject the first chamber to a pressure that is greater than that of the second chamber, the second end face being formed as a first contact surface of the sealing ring, the installation chamber comprising a second contact surface on the side axially facing the first contact surface, and the first and the second contact surfaces resting against one another and being congruent. The invention also relates to the use of such a sealing arrangement.

BACKGROUND

A sealing arrangement of this type is known from DE 197 28 605 A1. The known sealing arrangement comprises a rod or piston seal, which is substantially C-shaped and is axially open toward the first chamber to be sealed. Depending on the extent to which the pressure in the first chamber is greater than in the second chamber, the sealing lips of the sealing ring expand to a greater or lesser extent in the radial direction and abut the surfaces to be sealed of the machine elements to be sealed with respect to one another with a corresponding amount of pretension.

The two sealing lips are dynamically loaded. One sealing lip is sealingly supported on the boundary wall of the installation chamber of the second machine element, while the other dynamically loaded sealing lip is supported on the surface to be sealed of the first machine element, which, with respect to the second machine element, can move forward and backward in the axial direction in a translational manner.

The contact surfaces of the sealing ring and of the installation chamber that face one another each extend in the radial direction. The extent to which the sealing lips radially press against each of the surfaces to be sealed is merely dependent on the expansion of the sealing lips caused by the excess pressure. A supporting bulge that is radially convexly curved toward the first machine element is arranged in the region of the contact surface of the sealing ring and is connected to the axially opposite sealing lip by means of an arcuate portion. The arcuate portion comprises at least two grooves which extend in the circumferential direction and are axially adjacent to one another, with ridges being arranged between the grooves, which, together with the grooves, delimit pockets of lubricant.

SUMMARY

In an embodiment, the present invention provides a sealing arrangement for sealing two chambers that are adjacent to one another in an axial direction and are to be sealed with respect to one another, comprising: a first machine element; a second machine element, the second machine element surrounding the first machine element with a radial spacing therebetween and the sealing ring being arranged in the gap formed by the radial spacing; and a sealing ring, the sealing ring comprising at least one dynamically loaded first sealing lip, which sealingly surrounds a surface to be sealed of the first machine element, the sealing ring being arranged in an installation chamber of the second machine element and the sealing ring comprising a first and a second end face, the first end face axially facing the first chamber to be sealed and the second end face axially facing the second chamber to be sealed, the first chamber being subjected to a pressure that is greater than that of the second chamber, the second end face comprising a first contact surface of the sealing ring, the installation chamber comprising a second contact surface on a side axially facing the first contact surface, and the first and the second contact surfaces resting against one another and being congruent, wherein the contact surfaces each comprise slanting planes such that, when the sealing ring is axially moved toward the second chamber, an internal diameter of the at least one sealing lip sealingly surrounds the surface to be sealed with increasing radial pretension, the contact surfaces each forming an angle of between 5° and 45° with respect to an imaginary radial plane that intersects the contact surfaces.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is a schematic view of the sealing ring from FIG. 1 and FIG. 2 in the installed state, the differential pressure applied to the sealing ring being approximately 25 bar.

DETAILED DESCRIPTION

Figure 1:
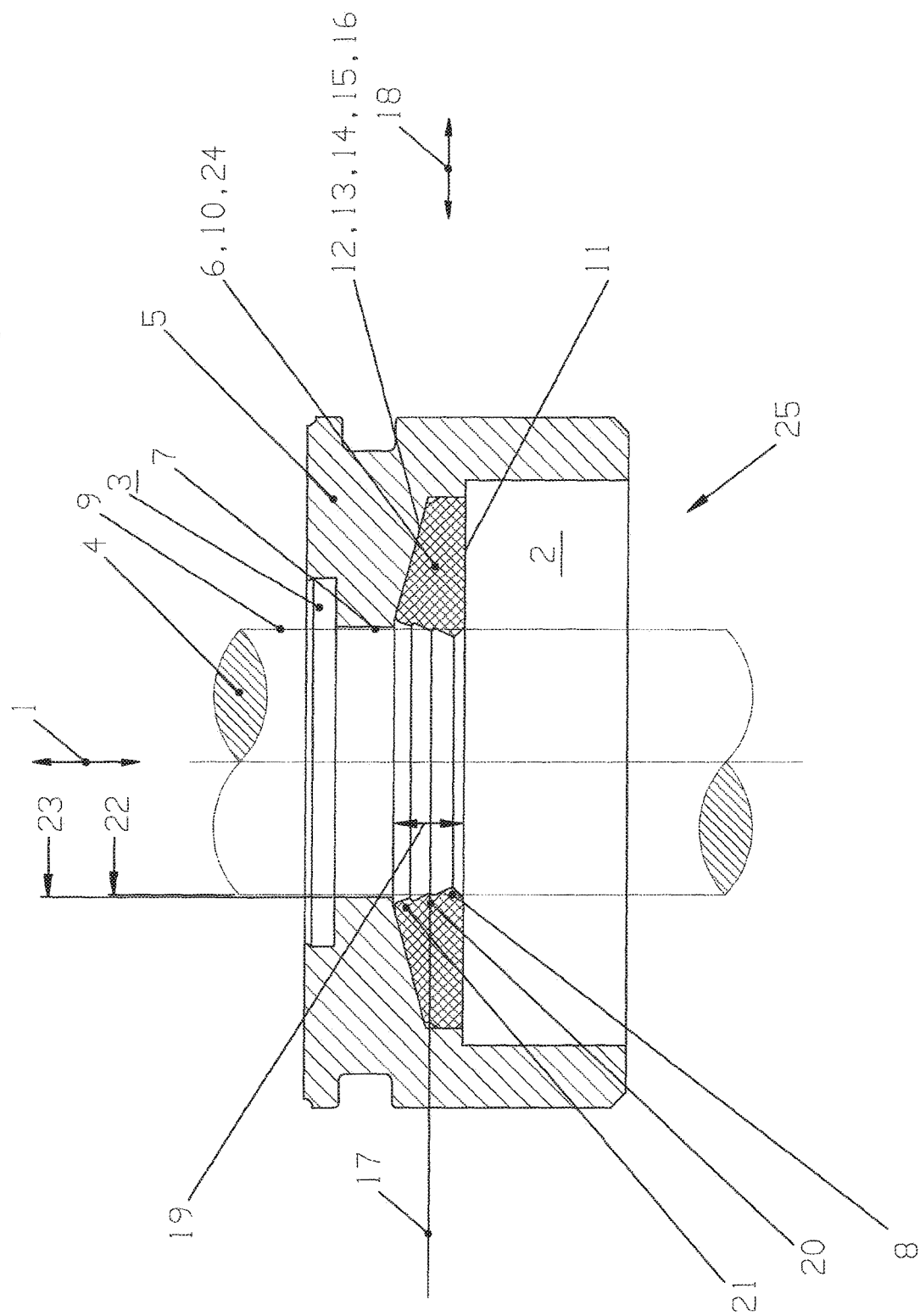
FIG. 1 is a schematic view of an embodiment of the sealing arrangement according to the invention in the assembled state, the sealing ring being shown in the production state.

In an embodiment, the present invention provides a sealing arrangement having contact surfaces each being formed as slanting planes such that, when the sealing ring is axially moved toward the second chamber, the internal diameter of the at least one sealing lip sealingly surrounds the surface to be sealed with increasing radial pretension, the contact surfaces each forming an angle of between 5° and 45° by means of an imaginary radial plane that intersects the contact surfaces.

In this case, it is advantageous for the sealing ring to have a very simple geometric shape, in particular for it not to be C-shaped, and for it to still sealingly surround the surface to be sealed of the first machine element with a variable radial pressing force, depending on how high the relative excess pressure in the first chamber is.

The first sealing lip sealingly surrounds the surface to be sealed of the first machine element in every operating state; i.e. even when there is no difference in pressure between the two chambers to be sealed. In such a case, there is sufficient resilient pretension in the radial direction, by means of which pretension the first sealing lip sealingly surrounds the surface to be sealed of the first machine element due to it overlapping with the first machine element, for the two chambers to be reliably sealed with respect to one another.

In contrast, if the pressure in the first chamber increases with respect to the pressure in the second chamber, the sealing ring is axially pressed toward the second chamber. The first contact surface of the sealing ring that is formed as a slanting plane is pressed against the second contact surface, which is also formed as a slanting plane, of the installation chamber with an increasing amount of force. As a result of the slanted nature of the first and second contact surfaces, when pressure is applied to the sealing ring, the sealing ring is axially moved out of the first chamber to be sealed, axially toward the second chamber, and the two contact surfaces simultaneously move on one another such that, as the pressure in the first chamber increases and the first contact surface moves on the second contact surface, the internal diameter of the sealing ring is reduced and the sealing lip is thereby pressed against the surface to be sealed of the first machine element with an increasing amount of force.

The radial pretension with which the first sealing lip sealingly surrounds the surface to be sealed of the first machine element therefore correlates with the relative excess pressure in the chamber to be sealed.

For most applications, it has proven advantageous for the contact surfaces to each form an angle of between 5° and 45° by means of an imaginary radial plane that intersects the contact surfaces.

The use properties are particularly advantageous when the angles are between 10° and 30°. The comparatively small angles mean that the sealing arrangement is compact in the axial direction, and the radial pretension of the sealing ring at the surface to be sealed of the first machine element can be significantly increased, even when the sealing ring only slightly moves axially toward the second chamber to be sealed that is on the low-pressure side.

The first end face can be arranged in parallel with the imaginary radial plane in the radial direction. The first end face forms the surface to which the relative excess pressure from the first chamber to be sealed is applied. The first end face is in the shape of an annulus and has a substantially flat surface in the radial direction without any abrupt changes in direction.

In conjunction with the first end face extending in the radial direction, the above-described angles provide an embodiment, whereby the sealing ring has a thickness in the axial direction than increases in the radial direction toward the first sealing lip. As a result, the inner circumferential surface of the sealing ring has a larger axial extent than the outer circumferential surface. In this case, it is advantageous for the comparatively large extent of the inner circumference in the axial direction to be used to provide additional sealing lips in addition to the first sealing lip if needed, which lips are arranged in a functional series downstream of the first sealing lip.

At least one dynamically loaded additional sealing lip can be axially assigned to the first sealing lip on the side facing the contact surfaces so as to be axially adjacent thereto in a functional series. Such a functional series of sealing lips is advantageous for improving the use properties of the sealing arrangement, in particular the sealing effect at high pressures to be sealed. Nevertheless, friction power and wear of the sealing lip are intended to be as low as possible.

The closer the additional sealing lips are to the contact surfaces in the axial direction, the larger their diameter can be than the first sealing lip, Such an embodiment makes it possible to minimize the friction power and wear of the sealing lips, as described above. As the pressure in the first chamber increases, in addition to the first sealing lip, the additional sealing lips are brought into sealing contact with the first machine element one after the other, depending on how high the pressure is in the first chamber.

If there is no difference in pressure between the two chambers to be sealed with respect to one another or if there is only a very slight difference in pressure, for example of up to 5 bar, only the first sealing lip surrounds the surface to be sealed of the first machine element with a comparatively low amount of radial pretension.

In contrast, if the difference in pressure is greater than this, for example in the event of a pressure difference of approximately 15 bar, the additional sealing lip that is axially closest to the first sealing lip also sealingly abuts the surface to be sealed of the first machine element. In this case, the radial pretension of the first sealing lip is greater than the radial pretension of the additional sealing lip.

If the pressure difference increases further, for example to 25 bar or more, all the sealing lips sealingly surround the surface to be sealed of the machine element to be sealed with radial pretension, the radial pretension with which the first sealing lip sealingly surrounds the surface to be sealed of the first machine element to be sealed being the greatest in this case too, and the radial pretension of the axially adjacent sealing lips decreasing as the axial spacing from the first sealing lip increases.

As a result, the geometry of the sealing ring is perfectly adapted to the respective conditions of the application, in particular to the size of the pressures to be sealed, with friction power and wear thus being minimized and the service life of the sealing ring being maximized.

The sealing ring can preferably be integrally formed. Such a sealing ring is simple and cost-effective to produce. It is also extremely simple to mount the integral sealing ring and the risk of mounting errors is kept to a minimum. This is particularly advantageous with regard to multipart sealing rings.

The sealing ring is preferably made of a homogeneous material. In addition to the sealing ring being simple and cost-effective to produce, it is advantageous that such a sealing ring can be separated and recycled at the end of its service life.

The primary material used for the sealing ring can comprise a filler.

The filler preferably reduces wear and/or friction. Such a design makes the sealing lips used extremely durable, even in the event of a lack of lubrication that may occur, and therefore the sealing ring has consistently good use properties over a long service life. In addition, this can positively affect the ability of the slanting planes of the sealing ring and the second machine element to slide on one another.

It has proven advantageous for the sealing ring to at least primarily consist of an FKM material. The sealing ring thus has good durability which remains effective over a long service life, can be used in a wide range of temperatures and is resistant to most media to be sealed.

In addition, the invention relates to the use of a sealing arrangement of the above-described type in a monotube shock absorber. Such monotube shock absorbers are used, for example, in motor vehicles and have, in comparison with twin-tube shock absorbers, a simple construction consisting of a small number of parts and are therefore inexpensive to produce.

In a monotube shock absorber, the sealing ring is statically pretensioned inside its installation chamber, specifically with a relative excess pressure in the first chamber to be sealed of approximately 15 bar. When the monotube shock absorber is used as intended, the differential pressure changes depending on whether the monotube shock absorber is compressed or extended in the axial direction. However, irrespective of the operating conditions, a static relative excess pressure is always present in the first chamber to be sealed.

FIG. 1 is a schematic view of an embodiment of a sealing arrangement according to the invention. The sealing arrangement from FIG. 1 is used in a monotube shock absorber for a motor vehicle and comprises the first machine element 4, the second machine element 5 and the sealing ring 6, which seals the two chambers 2, 3 with respect to one another, which chambers are adjacent to one another in the axial direction 1.

The first machine element 4 is formed as a piston of the monotube shock absorber 25, and the second machine element 5 is formed as a housing for the monotube shock absorber 25, which surrounds the piston on the outside. The piston can move forward and backward relative to the housing in the axial direction 1, the piston being surrounded by the housing with a radial spacing. The sealing ring 6 is arranged inside the installation chamber 10, in the gap 7 formed by the radial spacing. The sealing ring 6 comprises the dynamically loaded first sealing lip 8 and two additional dynamically loaded sealing lips 20, 21, which are arranged in a functional series downstream of the first sealing lip 8 on the side axially facing away from the first chamber 2 to be sealed.

The sealing ring 6 is in the shape of an annulus and comprises a first 11 and a second 12 end face. The first end face 11 axially faces the first chamber 2 to be sealed and the second end face 12 axially faces the second chamber 3 to be sealed. The first chamber 2 forms the high-pressure chamber of the monotube shock absorber 25, whereas the second chamber 3 forms the low-pressure chamber.

The second end face 12 of the sealing ring 6 is formed as a first contact surface 13, the first contact surface 13 resting against a second contact surface 14, which is a component of the second machine element 5 and is arranged on the side of the second machine element 5 that axially faces the first contact surface 13.

The contact surfaces 13 are each formed as slanting planes 15, 16. When the sealing ring 6 is axially moved toward the second chamber 3 arranged on the low-pressure side, the internal diameters of the sealing lips 8, 20, 21 are reduced by the contact surfaces 13, 14 moving radially on one another toward the surface 9 to be sealed. The contact surfaces 13, 14 shown here each form an angle $\alpha 1$, $\alpha 2$ of from 12 to 25 degrees by means of the imaginary radial plane 17, which intersects the contact surfaces 13, 14 in the radial direction.

The first end face 11 is axially opposite the second end face 12 of the sealing ring 6 and extends in the radial direction 18, in parallel with the imaginary radial plane 17. By means of the design of the end faces 11, 12 and the above-mentioned angles of the contact surfaces 13, 14, the sealing ring 6 has a larger thickness 19 on the radial inside thereof in the axial direction 1 than on the outer circumference thereof in the radial direction 18.

The sealing ring 6 is integral, is made of a homogeneous material and mainly consists of an FKM material, which can optionally be filled with a wear-reducing and/or friction-reducing filler 24.

The provision of such a filler 24 is particularly advantageous for the durability of the sealing lips 8, 20, 21.

During the transportation of motor vehicles by truck, cargo ship or train, very low-amplitude micro-vibrations can occur, the first machine element 4 moving relative to the second machine element 5, analogously to the micro-vibrations, the whole time that the motor vehicle is being transported. During transportation of the motor vehicle, the sealing lips 8, 20, 21 are only insufficiently lubricated in comparison with when the sealing arrangement is used as intended; for example, when the motor vehicle is travelling on the road, the first machine element 4 is moved axially relative to the second machine element 5 at amplitudes that vary in size, and the sealing lips 8, 20, 21 are sufficiently well lubricated as a result.

The wear-reducing and/or friction-reducing fillers 24 also prevent any disadvantageous wear of the sealing lips 8, 20, 21 when there is a lack of lubrication among the sealing lips 8, 20, 21, for example during transportation, as described above.

FIG. 1 shows an embodiment of the sealing arrangement according to the invention in the assembled state. The sealing 6 ring is shown in its production state. The first machine element 4 to be sealed is hidden and denoted by dot-dashed lines.

Said drawing shows that the internal diameter of the first sealing lip 8 is smaller than the diameter of the surface 9 to be sealed of the first machine element 4. As a result of this overlap, the first sealing lip 8 always sealingly surrounds the surface 9 to be sealed with radial pretension.

The diameter 22 of the sealing lip 20 that is axially adjacent to the sealing lip 8 is the same as or only very slightly smaller than the diameter of the surface 9 to be sealed. As a result, when there is no difference in pressure between the chambers 2, 3, the second sealing lip 20 only surrounds the surface 9 to be sealed with a very small amount of radial pretension, if any at all.

In contrast, the third sealing lip 21 has a larger diameter 23 than the surface 9 to be sealed, and therefore the third sealing lip 21 only sealingly surrounds the surface 9 to be sealed in the event of a considerable difference in pressure between the chambers 2, 3 to be sealed, for example of 25 bar.

Figure 2:
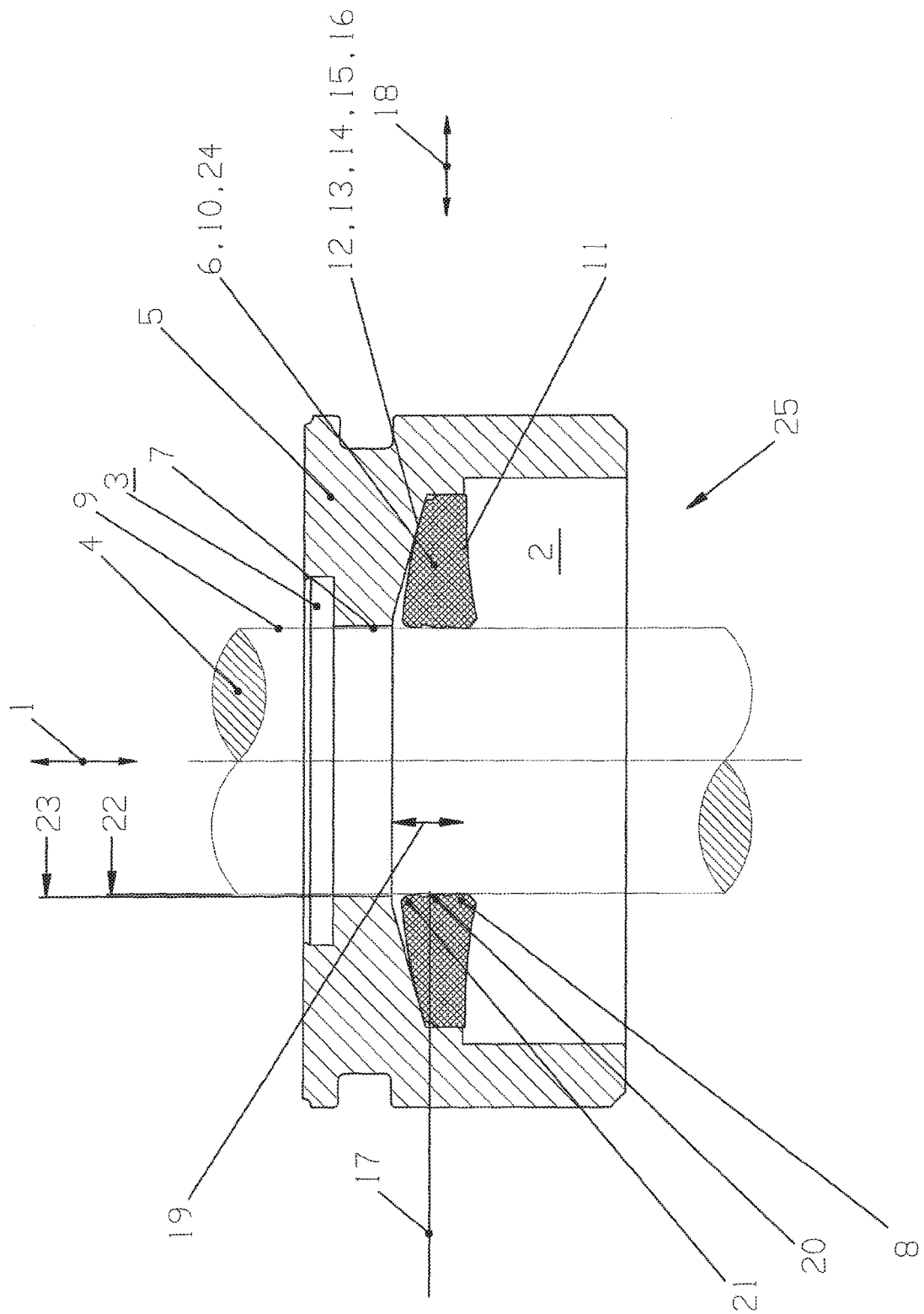
FIG. 2 is a schematic view of the sealing ring from FIG. 1 in the installed state, without the application of a differential pressure.

FIG. 2 shows a cut-out of the sealing arrangement in FIG. 1. The sealing arrangement is shown in the assembled state, the difference in pressure between the chambers 2, 3 to be sealed being approximately 0 bar. The first sealing lip 8 sealingly surrounds the surface 9 to be sealed with a sufficiently large amount of radial pretension, the second sealing lip 20 also sealingly surrounds the surface 9 to be sealed with a relatively lower amount of radial pretension, and the third sealing lip 21 surrounds the surface 9 to be sealed with a radial spacing therebetween; it does not touch the surface 9 to be sealed.

FIG. 3 shows a cut-out of FIGS. 1 and 2, the difference in pressure between the chambers 2, 3 to be sealed with respect to one another being approximately 25 bar. In this operating state, the surface 9 to be sealed is sealingly surrounded by all three sealing lips 8, 20, 21 with radial pretension, the radial pretension of the first sealing lip 8 being the greatest, the radial pretension of the second sealing lip 20 being the second greatest and the radial pretension of the third sealing lip 21 being the smallest.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sealing arrangement for sealing a first chamber and a second chamber that are adjacent to one another in an axial direction and are to be sealed with respect to one another, comprising:
    a first machine element;
    a second machine element including an installation chamber, the second machine element surrounding the first machine element with a radial spacing therebetween forming a gap; and
    a sealing ring arranged in the gap, the sealing ring comprising at least one dynamically loaded first sealing lip, which sealingly surrounds a surface to be sealed of the first machine element, the sealing ring being arranged in the installation chamber, the sealing ring comprising a first and a second end face, the first end face axially facing the first chamber and the second end face axially facing the second chamber, the first chamber being subjected to a pressure that is greater than that of the second chamber, the second end face comprising a first contact surface of the sealing ring, the installation chamber comprising a second contact surface on a side axially facing the first contact surface, and the first and the second contact surfaces resting against one another and being congruent,
    wherein the first and second contact surfaces each comprise slanting planes such that, when the sealing ring is axially moved toward the second chamber, an internal diameter of the at least one dynamically loaded first sealing lip reduces with increasing radial pretension on the surface to be sealed, the first and second contact surfaces each forming an angle of between 5° and 45° with respect to an imaginary radial plane that intersects the first and second contact surfaces.

2. The sealing arrangement of claim 1, wherein each of the angles is between 10° and 30°.

3. The sealing arrangement of claim 1, wherein the first end face is arranged in parallel with the imaginary radial plane in a radial direction.

4. The sealing arrangement of claim 3, wherein the sealing ring has a thickness in the axial direction that increases in the radial direction toward the first sealing lip.

5. The sealing arrangement of claim 1, further comprising at least one dynamically loaded additional sealing lip that is axially assigned to the first sealing lip on a side facing the first and second contact surfaces so as to be axially adjacent thereto in a functional series.

6. The sealing arrangement of claim 5, wherein the at least one dynamically loaded additional sealing lip comprises two additional sealing lips, and
    wherein the closer the additional sealing lips are to the contact surfaces in the axial direction, the larger their diameter is than the first sealing lip.

7. The sealing arrangement of claim 1, wherein the sealing ring is integrally formed.

8. The sealing arrangement of claim 1, wherein the sealing ring comprises a homogeneous material.

9. The sealing arrangement of claim 1, wherein the sealing ring comprises a primary material, and the primary material comprises a filler.

10. The sealing arrangement of claim 9, wherein the filler is configured to reduce wear and/or friction.

11. The sealing arrangement of claim 1, wherein the sealing ring comprises an FKM material.

12. The use of the sealing arrangement of claim 1 in a monotube shock absorber.

* * * * *